May 1, 1962 E. H. LAND ETAL 3,032,008
APPARATUS FOR MANUFACTURING PHOTOGRAPHIC FILMS
Filed May 7, 1956 4 Sheets-Sheet 1

INVENTORS
Edwin H. Land
David S. Grey and
BY Otto E. Wolff
Brouvard Mikulka
and
Robert E. Corb
ATTORNEYS

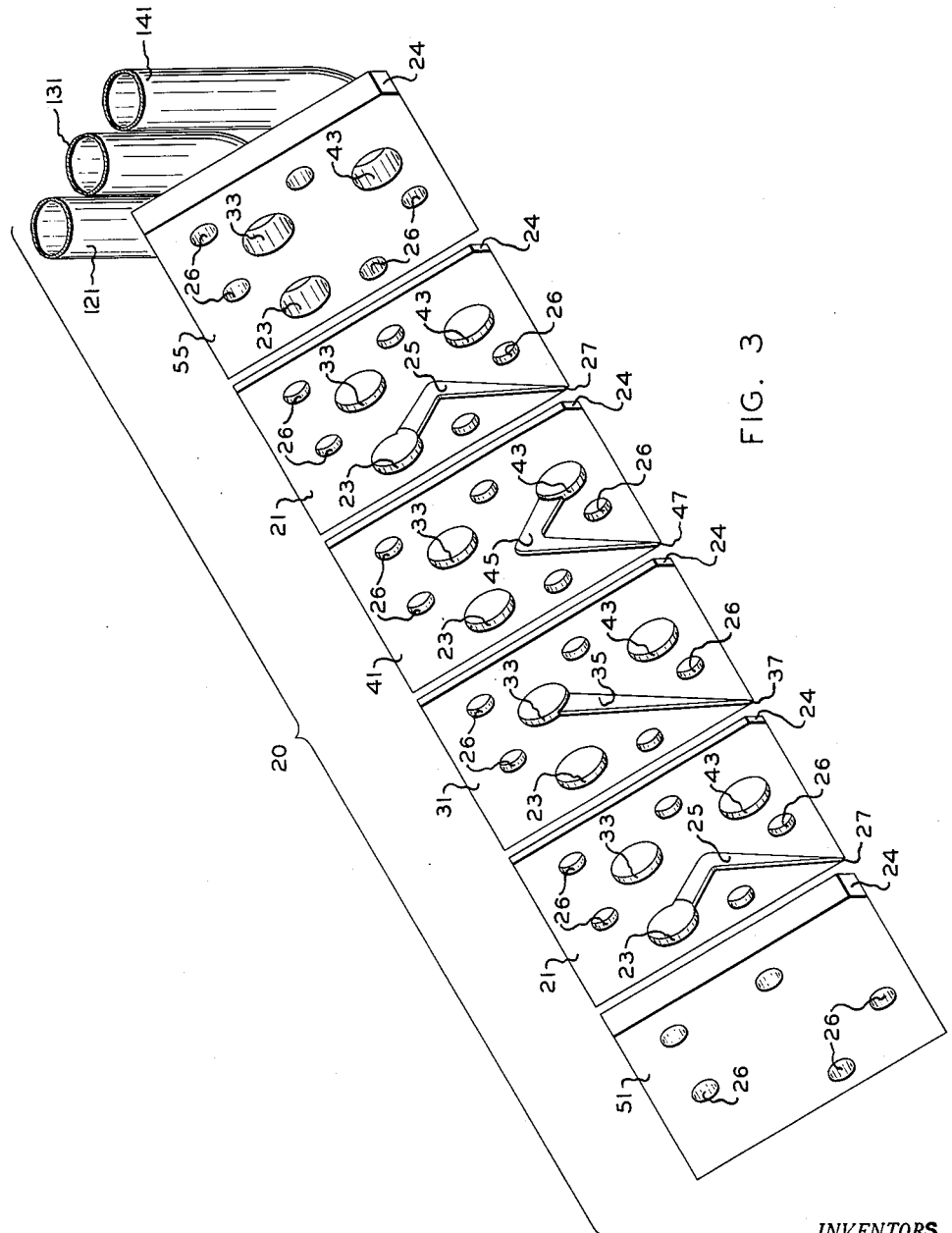

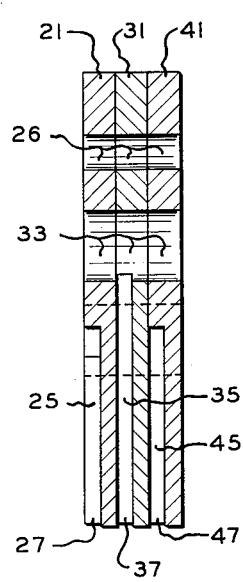
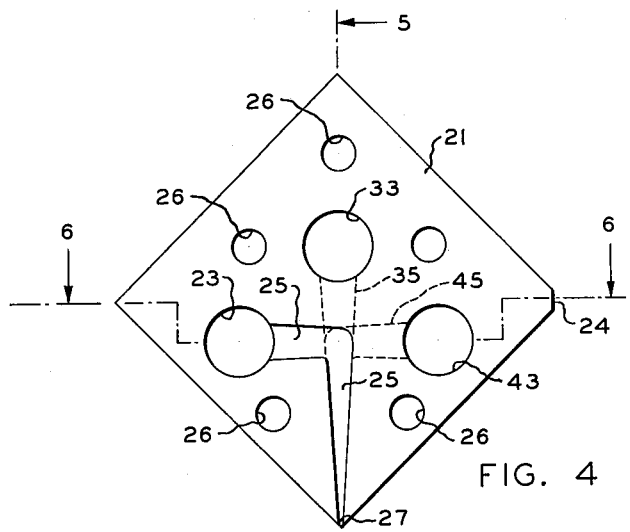
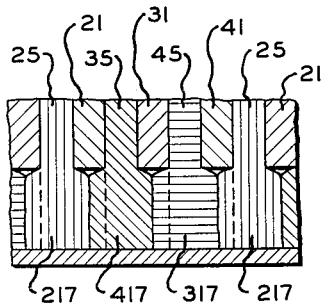
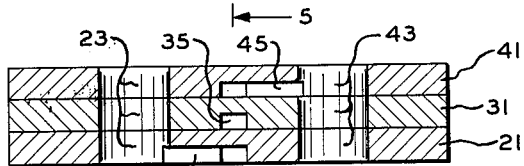
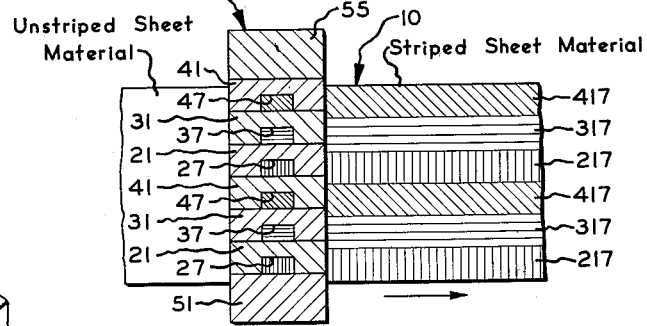
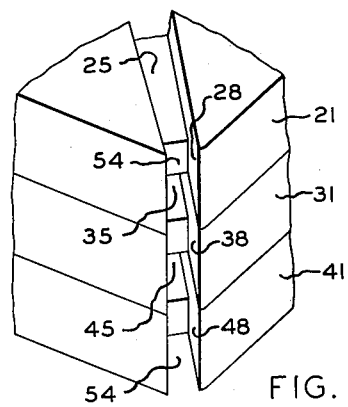

May 1, 1962 E. H. LAND ETAL 3,032,008
APPARATUS FOR MANUFACTURING PHOTOGRAPHIC FILMS
Filed May 7, 1956 4 Sheets-Sheet 4

INVENTORS
Edwin H. Land
David S. Grey and
BY Otto E. Wolff
Brown and Mikulka
and
Robert E. Cort
ATTORNEYS

United States Patent Office 3,032,008
Patented May 1, 1962

3,032,008
APPARATUS FOR MANUFACTURING PHOTOGRAPHIC FILMS
Edwin H. Land, Cambridge, and David S. Grey and Otto E. Wolff, Weston, Mass., assignors to Polaroid Corporation, Cambridge, Mass., a corporation of Delaware
Filed May 7, 1956, Ser. No. 583,309
16 Claims. (Cl. 118—411)

This invention relates to the manufacture of composite lined films and more particularly to apparatus for producing, by extrusion, thin filmlike materials finding particular utility in photographic processes.

Objects of the invention are: to provide apparatus for manufacturing, by extrusion, films comprising a multiplicity of line elements of two or more different materials; to provide apparatus of the foregoing type for manufacturing lined film of submacroscopic thickness and comprising line elements of submacroscopic width; and to provide apparatus of the above type particularly suited to the manufacture of photographic screen structures capable of influencing image formation.

Other objects of the invention are: to provide apparatus for manufacturing a film comprising a multiplicity of adjacent parallel line elements of submacroscopic widths and comprising two or more different materials with each line element of one material being bounded on at least one side by a line element of a different material; and to provide apparatus of the aforementioned type whereby accurate control may be had over both the depth of the film produced and the width of the line elements comprising said film.

Further objects of the invention are: to provide apparatus for extruding a lined film including means for concurrently extruding a multiplicity of extremely fine streams of one or more extrudible fluids onto a moving support in such a way that said fluid dries to form a film comprising lines of submacroscopic width; and to provide, in apparatus of the above type, a multiplicity of aligned nozzles having discharge openings of submacroscopic dimensions, said nozzles comprising at least two sets of nozzles with the nozzles in each set being connected to a supply of fluid under pressure.

Other objects of the invention will in part be obvious and will in part appear hereinafter.

The invention accordingly comprises the process involving the several steps and the relation and order of one or more of such steps with respect to each of the others, and the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is an exploded perspective view of the extrusion head showing the platelike components thereof;

FIG. 4 is a plan view showing the three platelike components of one repetitive unit of the extrusion head shown in stacked relation to illustrate their assembly and function;

FIG. 5 is a sectional view taken along the line 5—5 of FIG. 4;

FIG. 6 is a sectional view taken along the line 6—6 of FIG. 4;

FIG. 7 is a sectional view through a typical extrusion head showing the arrangement of discharge openings and schematically illustrating the striping of a sheet moving under the extrusion head;

FIG. 8 is an enlarged perspective view of a portion of the extrusion head of FIG. 3 showing a modification of the head;

FIG. 9 is a schematic sectional view taken through the modified extrusion head of FIG. 8 illustrating its operation;

Figure 1:
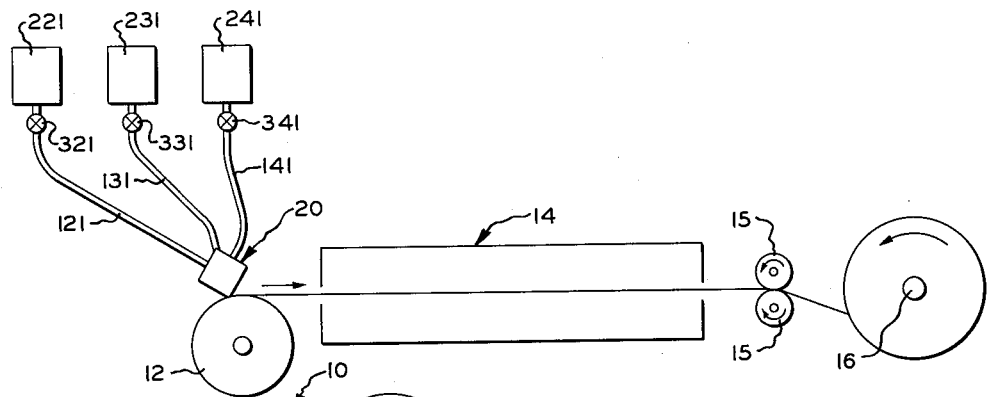
FIGURE 1 is a schematic view of apparatus embodying the invention illustrating the method of the invention for continuously manufacturing a lined photographic element.
Figure 2:
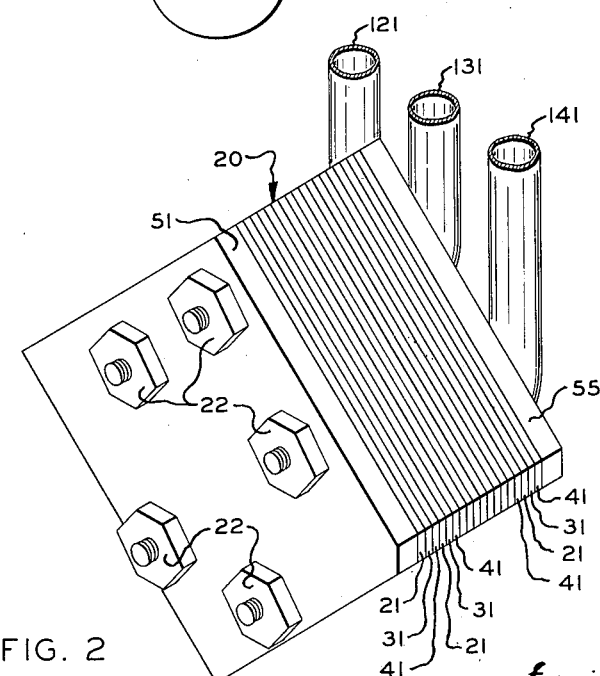
FIG. 2 is a perspective view of a fluid extrusion head embodying the invention.

As already intimated, the present invention is concerned with processes and devices for providing a screen type of structure especially useful in the art of photography. However, the invention finds utility for other than photographic purposes in instances where individual line elements are required to be formed in parallel relation to each other in or on a support layer, i.e., at least in a stratum adjacent the surface of said support layer.

The prior art practices for forming screen structures are typified by procedures used in the photographic field for forming color screens. Joseph S. Friedman, at page 142 in his "History of Color Photography," 1944, the American Photographic Publishing Company, Boston, classifies schemes for making color screens in eight general groups. Of these prior procedures, possibly those which have become best known and which have enjoyed the widest success are the practices wherein colored particles are evenly distributed on a support surface by "dusting-on methods" and the practice of utilizing resists, usually in conjunction with dye bleaching, for the dyeing of a support layer to provide a color screen having three or more sets of differently colored screen elements. An example of a color screen made by dusting-on methods is the so-called Autochrome plate of Lumiere, while an example of a color screen made by the use of resists and dyeing is one produced by the so-called Dufay process.

The schemes enumerated by Friedman for forming screen structures or the structures themselves have possessed certain inherent disadvantages.

A major disadvantage in the making of color screens has been the complexity of the procedure. For example, the controlled dyeing of a transparent layer by the utilization of resists requires nine procedural steps to produce a three-color screen comprising red elements, blue elements and green elements, as is pointed out in discussing the Dufay type of screen in U.S. Patent No. 2,681,857, issued June 22, 1954, to Howard G. Rogers. Needless to say, this complicated procedure adds materially to the cost of production.

Other practices for forming screens suffer from the disadvantage that they are impractical or cumbersome for mass production purposes. As examples of such practices, mention may be made of the production of a geometrical screen by photographic printing procedures, by photomechanical printing procedures and by ruling.

While a mosaic type of screen, such as the previously-mentioned Autochrome plate, is in general simple to produce by use of dusting-on methods, the resulting product inherently possesses a spotty appearance created by the presence in relatively large and separated areas of the screen of a predominance of one primary color over the other primary colors employed in the screen pattern.

Screen structures produced by the prior art have in general comprised differently colored elements consisting of a dye or pigment incorporated in a carrier, although practices are known wherein a sensitizing material is added to the screen element composition of a colorant in a carrier to the end of penetrating the sensitizing material into a silver halide emulsion on which the screen element composition is deposited whereby to impart a special sensitivity to regions of the emulsion in contact with the screen element composition.

The methods of forming a photographic screen structure of the present invention are considerably more versatile than practices heretofore employed by the prior art in that they are not restricted to the formation of screen elements consisting of a carrier and a colorant but, in addition, are useful for forming a screen pattern having screen elements comprising light-sensitive materials of different sensitivity characteristics, screen elements comprising one or more conventional photographic couplers or other types of color formers such as dyes having a coupling function, screen elements comprising developers for latent images formed in a light-sensitive material, screen elements comprising sensitizing dyes or filter dyes, as well as screen elements comprising various combinations of the constituents just specifically mentioned. Materials of this nature and including screen dyes and pigments all possess the characteristics that they may be defined as a photographic material, and by this term as used herein there is meant any one of the previously mentioned materials which are incorporated in suitable carriers for the formation of the screen elements of a screen pattern.

The screens of this invention comprise at least two different arrays of line elements and are formed by concurrently extruding, under pressure and onto a support surface, a multiplicity of streams of minute width of a first extrudible fluid comprising a photographic material and at least a second extrudible fluid comprising a second and different photographic material. These streams of fluid are flowed or directed over the support surface in slightly spaced-apart and parallel relation to each other and preferably in a direction parallel with the longitudinal axis of the support and so that, where deposited, they form lines of substantially uniform width which are in side-by-side contact at a position adjacent said surface. Both the extruded streams and the lines formed thereby possess extremely minute widths, i.e., widths of a submacroscopic order. The methods employed herein are particularly applicable for forming line elements in or on sheet materials by continuous processing which may be carried out on lengths of sheet material of one or more hundred feet and substantially of any desirable width within the range of commercial availability, i.e., from widths of several inches to widths of 40 inches or more.

In forming stripes in or on a support layer in accordance with the practices of this invention as by flowing fluid streams onto areas on the surface of the layer which extend in parallel relation to each other but which are slightly spaced apart, there will be some sidewise or lateral diffusion or spreading of the fluid in each stream deposited on the layer surface. However, these fluid streams are of submacroscopic width, for example each stream may have a width of 0.001 inch. The volume discharged by such a stream onto a minute unit length of a surface area on a support layer will be so small that sidewise spreading thereof will be extremely limited. This utilization of extruded fluids in streams of minute width is an important factor in controlling the sidewise diffusion of the fluids deposited on a support layer so as to provide on or in said layer parallel and contacting line elements which have substantially uniform widths of a submacroscopic order of magnitude whereby individual line elements in the screen pattern thus provided will be so small as to be indistinguishable to the average human eye or below the resolving power thereof.

Additional means for controlling this sidewise diffusion of fluids deposited on a support layer include the extrusion of the fluids at pressures which provide, at discharge from the extrusion nozzles, stream velocities of a magnitude that favors the sidewise spread desired for the streams as well as the employment of a relative rate of movement between the support layer and the fluids extruded thereon which also favors the attainment of the desired sidewise spread for each stream. Still further factors to be considered in this connection are the viscosity of each fluid, whether the fluids and the material of the support layer possess characteristics so that the fluids are penetrable depthwise of the layer or are depositable on the surface thereof, and the surface tension of the fluids employed. Factors of this nature which are able to exert an effect on the sidewise spreading of the fluid streams deposited on the support layer are employed in combinations best suited to the achievement of the results desired with due regard to the spacing between the fluid streams, which spacing is preferably of submacroscopic magnitude and which will determine the allowable sidewise spread of each fluid stream deposited on the suport layer. For example, the surface tension of the fluids may be controlled so that there is little or no sidewise spread of the spaced-apart streams of fluid and compressive pressure is then applied to the line elements to spread them into contact with one another to form a continuous film comprised of contacting line elements having substantially uniform widths. Alternatively, the physical characteristics of the fluids and the conditions under which the fluid streams are extruded may be such that the various streams spread sidewise into contact with one another immediately upon leaving the nozzles or dies through which they are extruded so as to join and form a continuous line screen prior to, or concurrently with, their deposit on a support layer.

Since the sidewise spread or diffusion of each stream commences immediately as it is formed and continues after deposit of the stream on the support surface until the stream contacts adjacent spreading streams, it is desirable, when the viscosity and other controlling physical factors of the various streams are uniform, to flow the streams into contact with a support surface at points lying substantially in a straight line which is perpendicular to the line elements being formed and concurrently in point of time. This means that the fluids comprising adjacent increments of adjacent line elements are deposited on the support surface simultaneously and adjacent one another and since they disperse or spread at the same rate, must necessarily spread to the same width. It may be desirable, however, to form line elements of uniform width of fluids having different spreading characteristics; or to extrude different fluids from nozzles having discharge openings which are not in a straight line and are spaced ahead or behind one another in the direction of travel of the moving support surface. These two factors, i.e., spreading rates and spacing of the discharge openings in the direction of travel of the support surface, may be controlled and coordinated so that the various streams spread sidewise uniformly. For example, nozzle openings for a first fluid having a sidewise spreading rate which is faster than the sidewise spreading rate of a second fluid would be spaced in the direction of movement of the support ahead of the nozzle openings for the slower spreading fluid so that the increments of the two line elements which are located adjacent one another spread sidewise to the same extent, the increment of the slower spreading fluid being deposited ahead, in time, of the faster spreading fluid increment.

In the formation of line elements, fluids are employed which have a wide viscosity range including low viscosity to high viscosity fluids. An example of a low viscosity fluid is a fluid in which at least one photographic material is dissolved or dispersed in a suitable vehicle and wherein the viscosity of the fluid approaches the viscosity of water, while an example of a high viscosity fluid is a fluid in which at least one photographic material is dissolved or dispersed in a vehicle comprising a solution of a film-forming substance having a concentration of said substance sufficient to provide a continuous film when the fluid is applied onto the support surface.

Penetration of a photographic material depthwise of a support layer will be influenced by the molecular weight or molecule size of the photographic material and the permeability of the layer to the fluid in which the photographic material is incorporated. Low viscosity fluids are generally employed in forming contacting line elements which have at least one photographic material therein and which extend depthwise of the surface of a support layer, while high viscosity fluids are generally employed to form contacting line elements which have at least one photographic material therein and which are carried on the surface of the support layer and extend outwardly thereof. It is also possible to provide contacting line elements in and on a layer so that each line element has a first portion which comprises one photographic material and which extends depthwise of said layer from the surface thereof and also has a second portion which comprises a different photographic material and which is carried on said surface to extend outwardly therefrom.

A film-forming substance which is included in an extrudible fluid provides means for retaining the photographic material of the fluid on the surface of the support upon which the fluid is discharged. Examples of film-forming substances comprise high molecular weight polymers or proteins such as gelatin, hydroxyethyl cellulose, a metal salt of carboxymethyl cellulose such as sodium or aluminum, cellulose acetate hydrogen phthalate, polyvinyl hydrogen phthalate and easily saponified film-forming substances such as shellac and japan wax.

Certain characteristics possessed by film-forming substances are uniquely utilized by the processes of this invention. For example, film-forming substances in general have such molecular weight that they are substantially impenetrable or at most only slightly penetrable into a preformed support layer when deposited thereon from a solution. Furthermore, the film-forming substance thus deposited on a support surface will harden or firm on said surface into a continuous film on evaporation of the liquid vehicle employed therewith.

These just-mentioned characteristics make it possible to form on a support surface a continuous film structure from fluids which have been extruded thereon so as to provide lines of fluid extending over said surface in side-by-side contact and which each comprises a film-forming substance and at least one photographic material. While the stratum so formed is in the nature of a continuous film, it is to be observed that the different line elements thereof retain their individuality and distinctiveness.

In general, the support comprises any one of a number of flexible and pliable sheet materials. As such, the support may comprise a unitary layer or a layer which is carried by or mounted on a base. The layer on which the fluids are to be extruded is characterized by being substantially homogeneous whereby the surface thereof on which the extruded fluids are discharged is substantially continuous and is further characterized by being formed of a material which may be opaque or transparent and which may be permeable or substantially impermeable to said fluids. It will, however, be understood that the support may be in a form other than a sheet, as, for example, a block or the like. Additionally, the streams of fluids may be extruded on a suitable support from which the film, resulting from the drying of the contacting line elements, may be removed.

For photographic purposes the layer onto which the fluid streams are extruded may be any one of a number of materials, such as gelatin or a liquid-permeable organic plastic, and may have substances, such as silver halide and/or other photographic material, dispersed therein; or said layer may comprise any conventional film base such as paper or one of the liquid-impermeable organic plastics used as a base material.

Mechanism for providing line elements or stripes in or on a support layer 10 which is in the nature of sheet material is schematically illustrated in FIG. 1 wherein said sheet is shown as undergoing movement along a predetermined path while being maintained in a generally flat condition and under slight tension. This mechanism, in addition to a rotatably mounted stock roll 11 of sheet material 10, comprises a rotatably mounted guide drum 12, an extrusion head or device 20 which is provided with a multiplicity of aligned extrusion nozzles and which is located adjacent the drum 12 and extends transversely across the path of sheet 10, a drying oven 14, a pair of superposed rotatable guide or pinch rolls 15 and a rotatably mounted and power driven wind-up or take-off roll 16.

Sheet material 10 follows a path which proceeds from stock roll 11 partially around the guide drum 12 and under the extrusion head 20, thence through oven 14 and between rolls 15 to the wind-up roll 16 which is constantly rotated, in appropriate direction, by conventional drive means (not shown) to draw the sheet stock at a substantially constant speed along the indicated path and to wind the processed stock in a roll. If desired, rolls 15 may also be driven at a speed similar to the wind-up roll 16.

All rolls and the drum 12, as well as the heater 14, are preferably at least slightly wider than the width of the stock undergoing processing. The rate of linear movement of the sheet stock 10 is maintained at about from five to twenty feet per minute, means (not shown) being provided to permit adjustment of this rate. The oven 14 is a conventional hot-air oven and utilizes hot air within its interior at around 120° F., including slightly higher or lower temperatures.

The extrusion head 20, in the form shown, comprises a multiplicity of extrusion nozzles in juxtaposed contact with each other and in an aligned arrangement whereby the individual discharge openings of the nozzles are in side-by-side relation with the respective centers of said discharge openings lying in a straight line which extends from end to end of the extrusion head. A similar arrangement is exemplified by that of the openings of the blow holes of a harmonica.

An assembly of the extrusion head 20 and details of the nozzles thereof are disclosed in FIGS. 2 through 6 of the drawings. In the illustrated embodiment of the invention, extrusion head 20 is shown as provided with three sets of nozzles. Individual fluids from reservoirs 221, 231 and 241 are respectively supplied under pressure through supply conduits 121, 131 and 141 to the individual nozzles of each set of nozzles of the extrusion head. Appropriate pressure-generating means 321, 331 and 341 such as gear or screw pumps are individually connected with each fluid reservoir and the fluid supply conduit associated therewith. Drive means for the pumps (not shown) are also provided as well as means for regulating the individual fluid pressure generated by each pump. Other pressure-generating means are contemplated. For example, the fluid in each reservoir 221, 231 and 241 could be placed under pressure by means of an inert gas such as nitrogen, especially in instances where low viscosity fluids are employed.

The extrusion head comprises three sets of thin metallic plates, hereinafter called nozzle plates. A plurality of nozzle plates are employed for each set with the individual nozzle plates in each set being indicated, respectively, by the reference numerals 21, 31 and 41. All of the nozzle plates 21, 31 and 41 are of similar size and shape. In one embodiment, each nozzle plate 21, 31 and 41 is square in shape, having sides of about 1½ inches, and is formed of stainless steel sheet stock having a thickness of about 0.002 inch. Nozzle plates of different shapes and thicknesses may be employed. The nozzle plates are mounted in a stack and secured together in registered face-to-face contact.

Each of the nozzle plates 21, 31 and 41 is provided with three apertures 23, 33 and 43 therethrough. The apertures in all plates are similarly and symmetrically located so that they may be appropriately registered when the plates are stacked. In addition, each nozzle plate 21, 31 and 41 is provided with a suitable number of openings 26 to permit fastening bolts 22 (see FIGS. 2 through 6) to extend therethrough for securing the nozzle plates in the previously described stack arrangement. Additional clamping means may be provided for retaining the nozzle plates in tight face-to-face contact.

It is to be observed that a channel 25, 35 and 45 is formed, respectively, in one face of each nozzle plate 21, 31 and 41, while the other face of each said plate is substantially a plane surface and without a channel therein. Each channel 25, 35 and 45 has a depth equal to a part of the thickness of its respective plate and is cut through the boundary edge of said plate at one corner of the plate and extends therefrom along the face of said plate to one of the plate apertures 23, 33 or 43 where it communicates with said aperture by being cut through the boundary edge thereof. Thus, the plate 21 has the aperture 23 connected with the channel 25, while the apertures 33 and 43 are unconnected. Similarly, the aperture 33 of plate 31 is connected with a channel 35 and the aperture 43 of each plate 41 is connected with a channel 45. The discharge mouths of the channels 25, 35 and 45 of each plate 21, 31 and 41 are indicated, respectively, by the reference numerals 27, 37 and 47.

Each channel has a depth usually equal to about one-half the thickness of the nozzle plate. Preferably, the width of the channel will be such that upon the placement of a cover over the channel it may be formed into a passage having a cross-sectional area at least for a short linear length of the channel near its discharge mouth which approaches the area of a capillary tube. For example, a channel may have a width, at least at its discharge mouth or opening, equal to the depth of the channel, or this width may be from two to five times greater than its depth. In general, it is unnecessary that each plate channel have a uniform cross section for its full length. For example, the channel may taper outwardly from shortly adjacent its discharge mouth toward the aperture with which it communicates.

The nozzle plates are formed by cutting suitably sized blanks from sheet metal material stock. Each blank has the openings 26, apertures 23, 33 and 43 and the channel 25 or 35 or 45 formed therethrough or therein, for example, by chemical etching practices carried out by the appropriate use of resists and in a manner well understood to the engraving art.

The nozzle plates are stacked in a repetitive order or series so that a plate 21 is followed by a plate 31, which latter is in turn followed by a plate 41, and with the series being repeated for the next unit so that the plate 41 of the first-mentioned unit is followed by a plate 21 of the next unit and so on from end to end of the stack. By this arrangement each adjacent pair of plates forms an extrusion nozzle of the head 20. Thus, extrusion nozzles are formed by the combination of a nozzle plate 21 (lead plate) with a plate 31 (follower plate), the combination of a nozzle plate 31 with a plate 41 and the combination of a nozzle plate 41 with a plate 21. In FIG. 3 only three plates 21, 31 and 41, comprising one of the repetitive units of the series of nozzle plates and a lead plate 21 of another repetitive unit of the series of plates, are shown for the sake of simplicity.

The ability to provide an extrusion nozzle by the use of a pair of nozzle plates is made possible by utilizing the unchanneled face of the lead plate of a pair of plates, for example, the plate 21 as a cover for the channeled face of the follower plate or plate next adjacent thereto which in this instance would be the plate 31. Thus, each pair of nozzle plates will form a nozzle having a closed passage connected at one end to a fluid entrance aperture in one of the follower plates and provided with a discharge opening or mouth at the other end. It is to be noted that a pair of nozzles are provided by a series of any three nozzle plates of an assembled stack of nozzle plates and that in this series of three the middle nozzle plate provides one of the walls for each nozzle of the pair of nozzles.

In the construction of the nozzles, it is the depth of the channel in the follower nozzle plate of a pair which determines the width of a stream of fluid extruded through the nozzle. In this regard the discharge mouth of the nozzle and the width dimension of the fluid adjacent said mouth is, as previously mentioned, of submacroscopic magnitude. This condition will be appreciated when it is recalled that the channel depth is of the order of 0.001 inch.

An assembled stack of nozzle plates is closed off at one end by means of a closure plate 51 and is provided with a header plate 55 at the other end. Both the closure plate 51 and the header plate 55 are similar in shape to the nozzle plates of the device but are both of a relatively rigid nature and are considerably greater in thickness than each nozzle plate. Closure plate 51 is provided with openings 26 for the fastening bolts 22, as is also the case for the header plate 55. In addition, the header plate is provided with fluid entrance apertures 23, 33 and 43 to which the feed lines 121, 131 and 141 from the sources of fluid supply are connected by conventional coupling means (not shown). Each nozzle plate, as well as the closure plate 51 and header plate 55, is provided with a flattened edge 24 at one corner which provides an index adapted to facilitate registration of the plates in the assembly of the extrusion head. Bolts or fasteners 22, which extend through the openings 26 in the closure plate 51, nozzle plates 21, 31 and 41 and the header plate 55, provide means for holding the plates in sufficiently tight face-to-face contact to provide a substantially fluid-tight seal around the edges of each pair of plates which provides a nozzle.

In the assembly of the extrusion head, it may be observed that the first extrusion nozzle adjacent the closure plate 51 comprises the closure plate and the nozzle plate in contact therewith, such as the nozzle plate 21 of FIG. 3. In the case of the nozzle at the header plate end of the stack, this may be provided by the pair of nozzle plates nearest the header plate 55, or alternatively, a suitable channel may be provided on the inner face of the header plate 55 and this used in conjunction with the unchanneled face of the nozzle plate next to the header plate 55. When this last-mentioned expedient is followed, the header plate 55 has a dual function, namely, that of a nozzle plate and a header plate.

Each of the sets of apertures 23, 33 and 43 in the stack of nozzle plates of the extrusion head 20 are in registered alignment with each other and provide three individual fluid conduits which will conduct fluid fed to the extrusion head from the header plate 55 to the closure plate 51 thereof. Also, the plates of the extrusion head are assembled so that the discharge openings of the nozzles will be located in registered alignment wherein the centers of these discharge openings lie in a straight line which extends from end to end of the extrusion head. This latter condition is especially well illustrated in FIG. 7 with reference to the discharge mouths or discharge openings 27, 37 and 47 of the individual channels of the nozzle plates there illustrated. By this arrangement, the discharge openings of the channels or passages, which are also the discharge openings of the nozzles themselves, are located in a pattern similar to that of the blow holes of a harmonica.

It is to be observed that each extrusion nozzle formed by an associated pair of plates is, by reason of the fluid discharge channel formed in the follower plate of said pair, connected with one of the fluid conduits of the plate pair. Consequently, fluid from the connected conduit will be supplied to the extrusion nozzle provided by the plate pair and will be extruded through the discharge mouth of said nozzle.

In the embodiment of the invention illustrated in FIG. 1, the extrusion head 20 is of such length as to extend transversely of the sheet material with the extrusion nozzle which is next to the closure plate 51 and the extrusion nozzle plate which is next to the header plate 55 located adjacent the respective side edges of the sheet material in positions to apply fluid onto the sheet material along longitudinally extending strips of minute width which each includes an edge of the sheet material. By this arrangement the extrusion head 20, when mounted over the sheet material on or in which line elements are to be formed, is so oriented with respect to said sheet that the depth dimension of each channel in a nozzle plate of the head is transverse to the relative path of movement of the sheet material with respect to the extrusion head. Under these conditions the channel depth employed for the nozzle plates will exert a major influence, as pointed out, on the width of the line elements formed on or in the sheet material, while the width of the discharge opening of each nozzle will exert no appreciable effect upon the width of the line elements so formed at least within the range of channel widths contemplated by this invention.

When it is considered that a nozzle plate thickness of 0.002 inch will require 500 plates to provide a stack of plates which is one inch in length, it will be appreciated that in some instances, where relatively wide widths of sheet material are to be striped with line elements, it will be desirable to employ several extrusion heads mounted to extend transversely across the path of movement of the sheet material and aligned one with the other. Spatial considerations require each extrusion head to be spaced somewhat from the head next to it when using several heads in the aligned arrangement just described. As a result the treated sections of the sheet material would be spaced from each other. Such a condition can be avoided, when using several extrusion heads, by locating each head so that it extends transversely of the path of movement of the sheet material and by spacing the heads from each other in the direction of movement of the sheet and in staggered relation at positions so that each lengthwise extending section of material treated by any one head will have at least one edge thereof in abutting relation to the edge of the section of the sheet which is treated by any other head located next thereto.

Also within the concept of the invention is the movement of an extrusion head while maintaining the sheet material in a stationary condition. For this purpose the extrusion head may be moved either transversely across or longitudinally of the particular piece of sheet material being treated. In instances where this practice is followed on sheet material that is of a continuous nature, the invention intends to treat it section by section with the section undergoing striping being held stationary and then being wound up while bringing a new and unstriped section in working relation to the movably mounted extrusion head.

To prevent the extruded streams from breaking up into droplets or globules or from becoming turbulent, the extrusion head is mounted over the sheet material which is undergoing striping at a spacing from the sheet such that each fluid stream at contact with the sheet has a width substantially equal to the width of the stream at the discharge opening of the nozzle through which it is extruded. In fact, the fluids are maintained under conditions of laminar flow within the extrusion head and between the extrusion head and the sheet material on which they are discharged.

When the extrusion head 20 is mounted as shown in FIG. 1, the fluid streams discharged through the nozzles thereof will be aligned on an axis extending transversely of the sheet material and will be spaced from each other by a distance equal to a part of the thickness of each nozzle plate due to the previously described harmonica type arrangement of the extrusion nozzles. Thus if each nozzle plate has a channel depth of one-half the plate thickness, each fluid stream at contact with the sheet material will be spaced from a stream next adjacent thereto by an interval also equal to one-half the nozzle plate thickness. However, these fluid streams are intended to provide line elements which are in contact with each other and which have widths equal to twice that possessed by each fluid stream at discharge from its respective nozzle. By means of the procedures and expedients heretofore described, fluids deposited on the sheet material are controllably spread or diffused sidewise to form the desired contacting line elements in and/or on the sheet. To illustrate the results of striping sheet material in this manner, there is presented in FIG. 7 a schematic illustration of sheet material 10 as it undergoes striping by an extrusion head 20 located in the path of the moving sheet.

For the sake of simplicity, extrusion head 20 of FIG. 7 is illustrated as comprising only two repetitive units or series of three nozzle plates 21, 31 and 41. These nozzle plates 21, 31 and 41, in conjunction with the closure plate 51 and header plate 55, are adapted to provide repeating units of three extrusion nozzles wherein the discharge openings thereof are indicated by the reference numerals 27, 37 and 47. Extrusion head 20 is shown as mounted over sheet material 10 undergoing movement to the right of this view as indicated by the arrow and FIG. 7 presents a horizontal sectional view taken through the extrusion head from end to end thereof at a location closely adjacent the discharge opening of each nozzle and looking downwardly onto the sheet material 10.

The arrangement for the extrusion head disclosed in FIG. 7 is adapted to permit the formation on and/or in the sheet material 10 of three arrays of line elements or stripes wherein the stripes providing the individual arrays are indicated by the reference numerals 217, 317 and 417. For the sake of illustration, the line elements 217, 317 and 417 are intended to be formed by fluids which are capable of providing red, blue and green stripes and which are extruded respectively through the nozzle plate openings 27, 37 and 47. Due to the construction and mounting of the extrusion head 20 with respect to the sheet 10 and the lengthwise movement of the sheet, it will be appreciated that the fluid streams discharged on the sheet will provide parallel stripes which extend longitudinally of the sheet.

Furthermore, the stripes 217, 317 and 417 are laid down on the sheet 10 in a pattern which repeats the series arrangement of the nozzles of the extrusion head. Thus a red stripe or line element of a first array of line elements and which is located at an edge of the sheet 10 will have a blue stripe or line element of a second array located adjacent one side thereof, while a red stripe located between the edges of the sheet 10 will have a blue stripe on one side thereof and a green stripe or line element of a third array located adjacent the other side thereof. Similarly, a blue stripe located between the edges of the sheet 10 will have a red stripe adjacent one side thereof and a green stripe which will be adjacent the other side thereof and which itself will also be adjacent to a red stripe.

As may be seen the fluid streams extruded through the discharge openings 27, 37 and 47 are intended to form line elements 217, 317 and 417 which each has a width equal to twice that of the depth of each nozzle plate channel. Therefore, the fluid in each stream discharged through an opening 27, 37 and 47 must, upon deposit on the sheet, be spread or diffused sidewise so that it will include not only an area of the sheet which is located directly below a discharge nozzle but will also embrace an area which extends on each side of the discharge opening. For example, if each nozzle plate has a thickness of 0.002 inch and the channel therein has a depth of 0.001 inch, the fluid stream extruded therethrough will have a width at contact with the sheet 10 also equal to 0.001 inch and must spread or diffuse sidewise on and/or in the sheet 10 by 0.0005 inch on each side of a nozzle discharge opening 27, 37 and 47 in order to extend across each area to be striped.

One feature of the extrusion head should here be noted, namely, that each wall of an extrusion nozzle is subjected to substantially the same pressure in instances when the fluids from the fluid reservoirs 221, 231 and 241 are supplied to the nozzles at substantially similar pressures. It is because of this that the nozzle plates may be formed of extremely thin sheet stock. However, it should be kept in mind that the nozzle plates are sufficiently thick to permit one or more nozzles of a repetitive unit to handle small differentials of fluid pressure. This ability of adjacent nozzles to handle small differences in fluid pressure is advantageous in cases when fluids of different viscosities are extruded.

In a modification of the present invention, the abovementioned factors controlling the sidewise spreading of the streams of fluid are so adjusted that the streams are caused to spread into contact with one another immediately as they are ejected from the nozzles in the extrusion head and prior to or simultaneously with their deposit on a moving support sheet. This process is illustrated in FIG. 9 and a portion of extrusion head 20, modified to adapt it to the performance of this process, is shown in FIG. 8. A portion of each of plates 21, 31 and 41 is removed in the region of discharge openings 27, 37 and 47, respectively, to form relatively short slots indicated, respectively, 28, 38 and 48 at the discharge end of, respectively, channels 25, 35 and 45. Thus, when the plates are secured in face-to-face relation, slots 28, 38 and 48 form a channel 54 extending longitudinally of the extrusion head and opening in the direction of flow of the fluids through the nozzles. As the fluids are ejected from the open discharge ends of channels or passages 25, 35 and 45 into channel 54, the streams spread sidewise into contact with one another to form a continuous striped film (as shown in FIG. 9) which is deposited on a support sheet moving past the discharge head in a direction normal to channel 54. Care must be exercised in controlling the composition and viscosity of the fluids and in determining the configuration of channel 54 so that the streams spread sidewise uniformly into contact with one another to form individual line elements 217, 317 and 417, but do not mix with one another.

Figure 10:
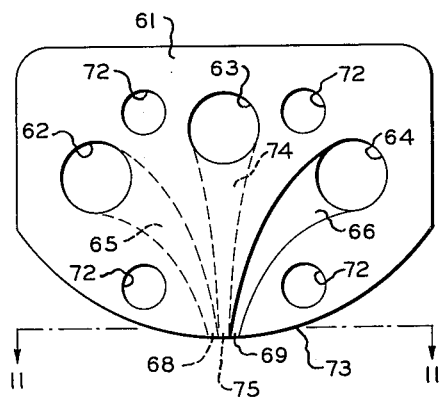
FIG. 10 is a plan view showing the three platelike components of one repetitive unit of another form of extrusion head embodying the invention.
Figure 11:
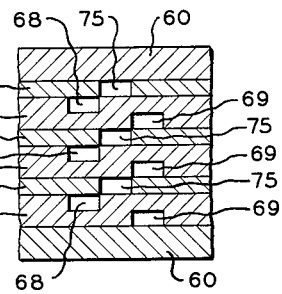
FIG. 11 is an enlarged sectional view taken along the line 11—11 of FIG. 10 and showing the arrangement of discharge openings of the extrusion head for schematically illustrating the striping of a sheet moving under the extrusion head.

It may be desirable to extrude a repetitive pattern of three streams of fluid onto a support surface in contact with one another, that is, without spaces between adjacent streams, when, for example, the nature of the fluids is such that they do not readily spread sidewise, or when the different fluids are absorbed depthwise into a support sheet in such a way that there is little or no sidewise diffusion. An extrusion head adapted to the extrusion of three different fluids in a repetitive pattern is illustrated in FIGS. 10 and 11 of the drawings and comprises, in addition to a pair of header plates 60, a plurality of sets of nozzle plates, each set comprising two plates indicated at 61 and 71. All of the nozzle plates 61 and 71 are of the same size and shape, having at least one curved boundary edge 73, and plates 61 are preferably twice the thickness of plates 71. Each of the nozzle plates 61 and 71 is provided with three apertures 62, 63 and 64 therethrough, the apertures in all the plates being similar and symmetrically located so that they may be appropriately registered when the plates are stacked. The nozzle plates 61 and 71 and the header plates include a suitable number of openings 72 which permit fastening bolts to extend therethrough for securing the nozzle plates together in a tightly stacked arrangement. Each of plates 61 is provided with a pair of channels 65 and 66 formed in opposite faces of the plates. Each channel 65 and 66 has a depth equal to substantially half the thickness of plates 61 and is cut through the curved boundary edge 73 of the plate adjacent the other channel, both channels being equal in width and being spaced at the boundary edge of the plate by a distance at least equal to their widths. Channel 65 communicates with aperture 62, channel 66 communicates with aperture 64, and apertures 63 are unconnected. The discharge mouths of channels 65 and 66 at the boundary edge of the plate are indicated, respectively, by reference numerals 68 and 69. Each of plates 71, which are half the thickness of plates 61, is formed with a channel or slot 74 completely through the plate and connecting aperture 63 with curved boundary edge 73 of the plate to form a discharge mouth 75 located midway between discharge mouths 68 and 69.

A plurality of plates 61 and 71 are stacked alternately between header plates 60 so as to define three sets of discharge nozzles with the nozzles of each set being connected with one of the apertures 62, 63 and 64. In FIG. 11 three plates 61 and 71, with two header plates 60 and comprising three repetitive units of the series of nozzle plates, are shown for purposes of illustration. Each of the sets of apertures 62, 63 and 64 in the stack of nozzle plates of the extrusion head are in registered alignment with each other and provide three individual fluid conduits which conduct fluids, fed to the extrusion head, from one header plate to the other, the latter being provided without apertures 62, 63 and 64 so as to function as a closure for the conduits. Similarly, the sets of discharge openings 68, 69 and 75 are located with the center of the openings in each set lying in a straight line which extends from end to end of the extrusion head and is spaced transversely of the extrusion head from the line of centers of the next adjacent set of openings by a distance equal to the width of the openings. In this construction of the nozzles, it is the depth of the channel or channels in each plate which determines the width of the stream of fluid extruded through the nozzles. By virtue of the particular arrangement shown and described, the passages and their discharge openings in each set of nozzles are spaced apart by a distance twice their lengths so that there is no lengthwise spacing of adjacent nozzle openings and the fluid streams discharged from the nozzles onto a support surface are in contact with one another and not spaced apart.

It is apparent that by this arrangement increments of fluid which lie adjacent one another in the formed line elements are not deposited on the support sheet simultaneously. However, the maximum spacing in the direction of movement of the support sheet between nozzle discharge openings depositing adjacent streams can be limited to a maximum of the width of one opening, and when it is considered that the width of the nozzle openings may be on the order of one-thousandth of an inch and the speed of movement of the support sheet may range between 5 and 20 feet per minute, it will be appreciated how the time differential between the deposit of adjacent fluid increments can be so short (less than one microsecond) as to have only negligible, if any, effect on the formation of the lines.

Figure 12:
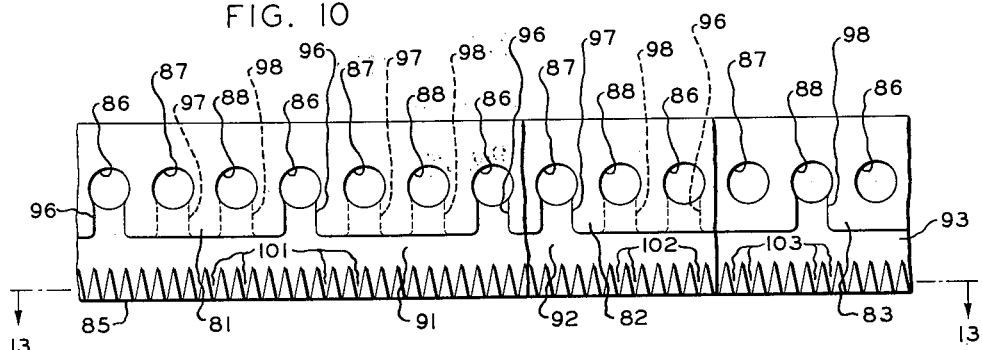
FIG. 12 is a plan view showing the platelike components comprising another embodiment of extrusion head for performing the invention.
Figure 13:
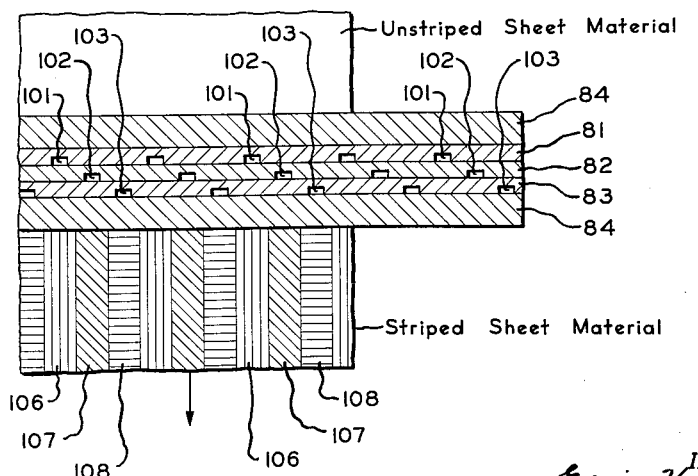
FIG. 13 is an enlarged sectional view taken along the line 13—13 of FIG. 10 and showing the arrangement of discharge openings of the extrusion head for schematically illustrating the striping of a sheet moving under the extrusion head.

The construction of another embodiment of an extrusion head capable of producing a striped film comprising a repetitive pattern of three different line elements is illustrated in FIGS. 12 and 13 of the drawings. This extrusion head comprises only three nozzle plates, indicated at 81, 82 and 83, sandwiched in face-to-face relation between a pair of header plates 84 but providing a large plurality of nozzles. Each nozzle plate provides one set of passages providing nozzles and may be of any desirable length extending the full length of the extrusion head. All three nozzle plates 81, 82 and 83, formed of thin sheet metal blanks, are of the same size and shape, being generally elongated and rectangular and each blank includes one longitudinal straight boundary edge 85 extending from end to end thereof and coextensive with the boundary edges of the other plates. Each of the nozzle plates 81, 82 and 83 and one of the header plates 84 are provided with a repetitive series of three apertures, indicated at 86, 87 and 88, located adjacent one another with their centers in a line which is parallel to boundary edge 85. The apertures in all the plates are similarly located so that they may be appropriately registered when the plates are stacked. The nozzle and header plates may also be provided with suitable apertures through which extend bolts as means for securing the plates in tightly stacked relation. A surface of each of plates 81, 82 and 83 is provided with a feeder channel, indicated at 91, 92 and 93 respectively, which extends from end to end of each plate parallel with and located between the line of centers of apertures 86, 87 and 88 and boundary edge 85. Every third aperture in each plate is connected to the feeder channel therein by a connecting channel opening into the aperture at one end and into the feeder channel at its other end. Thus, plate 81 includes connecting channels 96 between apertures 86 and feeder channel 91, plate 82 includes connecting channels 97 between apertures 87 and feeder channel 92, and plate 83 includes connecting channels 98 between apertures 88 and feeder channel 93.

The passages or nozzles of each set, i.e., the nozzles for each of the three fluids, comprise a plurality of channels in each plate extending from the feeder channel in the plate through the boundary edge 85 thereof. These channels comprising the three sets of passages and formed in plates 81, 82 and 83 are designated, respectively, 101, 102 and 103, the same numerals being employed in FIG. 13 to designate the discharge openings of the passages or nozzles. The depths of all the channels in the three nozzle plates are all equal to approximately half the thickness of the plates, bearing in mind that the plate thickness is preferably in the order of two thousandths of an inch. It is the width of channels 101, 102 and 103 at their discharge mouths which determines the width of the streams extruded through the nozzles onto a moving support sheet. The channels 101, 102 and 103 in, respectively, plates 81, 82 and 83 comprising each set of passages are preferably equal in width to one another and are spaced apart by a distance equal to 5 times their width. The three plates are stacked so that each passage in each set is spaced from the adjoining passage in the adjoining set by a distance substantially equal to the width of each passage so that the stripes, indicated at 106, 107 and 108, discharged from, respectively, discharge mouths 101, 102 and 103 as shown in FIG. 13, are initially separated from one another by a distance equal to the width of the discharge mouths and spread sidewise into contact with one another to form stripes which are twice as wide as the discharge mouths. The nozzle openings in each set are spaced in the direction of movement of the support sheet ahead or behind the nozzle openings in the adjoining set by a distance substantially equal to the depth of the channels or, in other words, one-half the thickness of the nozzle plates. The viscosity of the various fluids, for example, may be so controlled that the fluid extruded through the discharge openings of the set of nozzles, located ahead in the direction of movement of the support sheet, spreads or diffuses at a slower rate than the fluid extruded from a set of nozzles spaced behind the first-mentioned set of nozzles, so that the sidewise spread of each of the three streams is equal. However, as mentioned above, since the spacing between the discharge openings of sets of nozzles is in the order of one-thousandth of an inch, such an arrangement is likely to have little or no effect on the spreading of the fluid streams after their deposit on the support surface.

The manufacturing method and apparatus of the herein described invention are characterized by their relative simplicity as compared to known methods and apparatus for producing lined films or screens and, for the first time, make possible the large scale production of lined screens efficiently and inexpensively. Another advantage resides in the fact that accurate control of the depth and width dimensions of line elements comprising lined screens or films are achieved by the present method even though these dimensions are of a submacroscopic order.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. A fluid extrusion device comprising an extrusion head having a plurality of passages, said passages providing a plurality of nozzles having discharge openings comprising a first set of nozzles and at least a second set of nozzles, each nozzle comprising portions of a pair of plates secured together in face-to-face contact, said portion of one of said pair of plates, which is in facing relation to said portion of the other of said pair of plates, being provided with a channel having a depth which is a fraction of the thickness of the plate and which, together with the adjacent surface portion of said other plate, provides said nozzle, each of said plates having a channel therein being disposed in face-to-face contact with at least another of said plates having a channel therein, means for supplying a first extrudible fluid under pressure and at least a second and different extrudible fluid under pressure, means connecting said first set of nozzles with a supply of said first fluid, means connecting said second set of nozzles with a supply of said second fluid, the discharge openings of said first set of nozzles being located in side-by-side aligned relation lengthwise of said extrusion head, the discharge openings of said second set of nozzles being located in side-by-side aligned relation lengthwise of said extrusion head, the lengthwise dimensions of said discharge openings being of submacroscopic order, means for moving a support surface past said discharge openings in position to receive streams of said fluids extruded therefrom, the discharge openings in each of said sets being so located with respect to one another as to concurrently deposit a plurality of streams of one of said fluids onto said support surface in spaced-apart relation to form a plurality of line elements, said discharge openings being arranged in sequence lengthwise of said head with a discharge opening of said first set adjacent a discharge opening of said second set and with said sequence repeated for all of said discharge openings.

2. The fluid extrusion device of claim 1 wherein the lengthwise dimensions of the discharge openings of all the nozzles are substantially the same and the lengthwise spacing between discharge openings of nozzles of the same set is substantially equal to $n$ times the lengthwise dimension of said discharge openings, $n$ being one less than the number of sets of nozzles.

3. The fluid extension device of claim 1 wherein the lengthwise dimensions of the discharge openings of all the nozzles are substantially the same and the lengthwise spacing between discharge openings of nozzles of the same set is substantially an odd multiple of the lengthwise dimension of said discharge openings.

4. A photographic device as defined in claim 1 wherein said discharge openings of each of said sets of nozzles are arranged with their centers located in a line and the lines of centers of the discharge openings of different sets are parallel with one another and spaced apart by a distance not exceeding twice the transverse dimension of said discharge openings.

5. A fluid extrusion device as defined in claim 1 wherein all of said nozzles are mounted in juxtaposed and contacting relation and have their discharge openings substantially in side-by-side alignment.

6. A device as defined in claim 1 wherein said surface portion of said other plate next adjacent said surface portion of said one plate is substantially a plane.

7. A fluid extrusion device comprising at least two plates secured together in face-to-face contact, each of said plates having a thickness of submacroscopic order and including at least one first surface portion having a channel provided therein having a depth approximately equal to one-half the thickness of said plate and at least one second surface portion facing a first surface portion of the other plate, each of said channels in said first surface portions of said plates having a depth which is less than the thickness of the plate in which it is formed and having at least a portion extending from a position remote from an edge boundary of said plate outwardly toward and through said edge boundary to provide a discharge opening therein, each of said second surface portions being substantially planar and located adjacent one of said channels in one of said first surface portions and forming a wall over said channel so as to provide a passage comprising an extrusion nozzle, and means connecting each said nozzle to a supply of fluid under pressure.

8. A fluid extrusion device as defined in claim 7 wherein said nozzles comprise a first set of nozzles and at least a second set of nozzles, said nozzles of each set being arranged with the centers of their discharge openings located substantially in a line, said nozzles of different sets being arranged alternately lengthwise of said device, the latter including means for connecting each nozzle of said first set to a first supply of fluid under pressure and each nozzle of said second set to a second and different supply of fluid under pressure.

9. A device for extruding at least two extrudible fluids, said device comprising at least two similar plates secured in registered face-to-face contact, each said plate having a thickness of submacroscopic order and being provided with at least two spaced-apart fluid entrance apertures therethrough, each said plate including at least one first surface portion having a channel provided therein, said channel in each said plate communicating with one of said apertures and having a depth equal to a fraction of the thickness of said plate, a width of submacroscopic order and extending from said aperture and thence along the face of said plate toward and through an edge boundary of the plate to provide a discharge opening in said edge boundary, each of said plates including at least one second plane surface portion, said plates being assembled with a second surface portion located adjacent a channel to form a wall over said channel and provide a passage forming an extrusion nozzle, said plates being so registered that said fluid entrance apertures are aligned with one another to form conduits, and means for connecting each said conduit to a supply of fluid under pressure.

10. A device for concurrently extruding a plurality of extrudible fluids, said device comprising at least three similar plates mounted in a stack and secured together in face-to-face contact, each said plate having a thickness of submacroscopic order being provided with at least a first, a second and a third fluid entrance aperture, each said plate including at least one first surface portion having a channel provided therein, said channel in each said plate communicating with one of said apertures and having a depth equal to a fraction of the thickness of said plate and extending from said aperture and thence along the first surface portion of said plate toward and through an edge boundary of the plate to provide a discharge opening in said edge boundary, each said plate including at least one plane second surface portion, said plates being assembled with a second surface portion located adjacent each said channel to form a wall over said channel and thereby provide a passage forming an extrusion nozzle, said plates being so registered that said first fluid entrance apertures are aligned with one another to form a first fluid conduit, said second apertures are aligned to form a second conduit and said third apertures are aligned to form a third conduit, and means for connecting said first, second and third fluid conduits respectively with a first, second and third supply of individual fluid under pressure.

11. A fluid extrusion device comprising a plurality of similar plates mounted in a stack and secured together in registered face-to-face contact, each of said plates having a thickness of submacroscpoic order, one face of each plate being substantially a plane surface and the opposed face thereof having a channel provided therein, said channel in each said plate having a depth equal to a fraction of the thickness of said plate and having at least a portion extending along the face of said plate from a position located centrally of said plate toward and through an edge boundary of the plate to provide a discharge opening in said edge boundary, said plates being arranged in pairs with the plane face of one plate of each pair being adjacent to the channeled face of the plate next to it and forming a wall over said channel whereby each pair of plates together form a passage providing an extrusion nozzle, said plates being so registered in said stack that said discharge openings are in alignment one next to the other and lie substantially in a common plane, and means for connecting each said nozzle to a supply of fluid under pressure.

12. A fluid extrusion device as defined in claim 11 wherein the nozzles provided by each pair of plates comprise a first set of nozzles and at least a second set of nozzles with said nozzles arranged so that they are aligned in a series of repetitive units in which each unit includes a nozzle of said first set and continues in a nozzle sequence to include a nozzle of the last-mentioned set, said device including means for connecting each nozzle of said first set to a first supply of fluid under pressure and each nozzle of said second set to a second and different supply of fluid under pressure.

13. A fluid extrusion device as defined in claim 11 wherein the discharge mouth of each nozzle is separated from the discharge mouth of the nozzle next adjacent thereto by a distance approximating one-half the total thickness of each said plate.

14. A fluid extrusion device as defined in claim 11 wherein each said plate has a thickness of a submacroscopic order, and wherein each channel in said plate has a depth approximately equal to one-half the thickness of said plate.

15. A device for extruding at least two extrudible fluids, said device comprising a plurality of similar plates mounted in a stack and secured together in registered face-to-face contact, each of said plates having a thickness of submacroscopic order and being provided with at least two spaced-apart fluid entrance apertures therethrough, one face of each plate being substantially a plane surface and the opposed face thereof having a channel provided therein, said channel in each said plate communicating with one of said apertures and having a depth equal to a fraction of the thickness of said plate and extending from said aperture and thence along the face of said plate toward and through an edge boundary of the plate to provide a discharge opening in said boundary, said plates being assembled in pairs with the plane face of one plate of each pair being disposed in contact with the channeled face of the plate next to it and forming a wall over said channel whereby each pair of plates together provide a passage forming an extrusion nozzle, said plates being positioned in said stack with said fluid entrance apertures and said discharge openings aligned respectively with each other and with said discharge openings lying next to each other substantially in a common plane, and means for connecting each fluid entrance aperture to a supply of fluid under pressure.

16. A device for concurrently extruding a plurality of extrudible fluids, said device comprising a first, a second and at least a third set of similarly shaped nozzle plates which are mounted in a stack and secured together in face-to-face contact, each of said plates having a thickness of submacroscopic order and being provided with at least a first, a second and a third fluid entrance aperture, one face of each plate having substantially a plane surface and the opposed face thereof having a channel provided therein, said channel in each of the plates of said first, second and third set communicating respectively with said first, second and third apertures of said plates, each said channel having a depth equal to a fraction of the thickness of its respective plate and extending from the aperture with which it communicates and thence along the face of the plate toward and through an edge boundary of the plate to provide a discharge opening in said boundary, said plates being assembled in pairs with the plane face of one plate of each pair being adjacent to the channeled face of the plate next to it and forming a wall over said channel whereby each pair of plates together provide a passage forming an extrusion nozzle, said plates being assembled in said stack in a series of repetitive units in which each unit includes a nozzle provided in part by a plate of said first set and continues in a nozzle sequence to include a nozzle provided in part by a plate in the last-mentioned set and with said plates being arranged in said stack with said fluid entrance apertures and said discharge openings respectively aligned with each other and said discharge openings lying next to each other substantially in a common plane, and means for connecting said first, second and third fluid entrance apertures in each plate respectively with a first, second and third supply of individual fluid under pressure.

References Cited in the file of this patent

UNITED STATES PATENTS

| | | |
|---|---|---|
| 375,305 | Videto | Dec. 20, 1887 |
| 510,110 | Berkan | Dec. 5, 1893 |
| 561,686 | McDonough | June 9, 1896 |
| 611,457 | McDonough | Sept. 27, 1898 |
| 1,857,242 | Edmondson | May 10, 1932 |
| 2,031,387 | Schwarz | Feb. 18, 1936 |

FOREIGN PATENTS

| | | |
|---|---|---|
| 559,029 | Germany | Sept. 14, 1932 |
| 603,614 | Germany | Oct. 4, 1934 |
| 614,222 | Germany | Jan. 6, 1935 |
| 456,968 | Great Britain | Nov. 16, 1936 |